United States Patent [19]

Warren et al.

[11] 4,196,452

[45] Apr. 1, 1980

[54] TONE ERROR CONTROL FOR IMAGE CONTOUR REMOVAL

[75] Inventors: W. Thomas Warren, Webster; Peter A. Crean, Pennfield, both of N.Y.

[73] Assignee: Xerox Corporation, Stamford, Conn.

[21] Appl. No.: 965,667

[22] Filed: Dec. 1, 1978

[51] Int. Cl.² .................................................. H04N 1/40
[52] U.S. Cl. ...................................... 358/283; 358/284; 364/515; 358/298
[58] Field of Search ............... 358/283, 296, 298, 302, 358/282, 284; 364/515

[56] References Cited

U.S. PATENT DOCUMENTS

| | | | |
|---|---|---|---|
| 3,681,650 | 8/1972 | Koll | 315/30 |
| 4,051,536 | 9/1977 | Roetling | 358/283 |
| 4,084,259 | 4/1978 | Cahill et al. | 358/298 |
| 4,115,816 | 9/1978 | Moe et al. | 358/283 |

Primary Examiner—Robert L. Griffin
Assistant Examiner—Edward L. Coles

[57] ABSTRACT

A system for processing halftone image data in digital format. The image data is electronically screened to provide a binary output suitable for storage or printing, the image data being processed in discrete blocks or cells. The error between actual and printed average gray values of each image cell processed is determined and the electronic screen thresholds are modified in accordance with such error (if any) prior to processing the next image cell. At the beginning of the aforesaid process and at the beginning of the processing each line, an error is randomly chosen.

7 Claims, 13 Drawing Figures

| 48 | 40 | 12 | 4 |
|---|---|---|---|
| 36 | 56 | 63 | 20 |
| 24 | 52 | 60 | 28 |
| 8 | 16 | 32 | 44 |

| 49 | 49 | 49 | 49 |
|---|---|---|---|
| 49 | 49 | 49 | 49 |
| 49 | 49 | 49 | 49 |
| 49 | 49 | 49 | 49 |

FIG. 10

| 0 | 0 | 0 | 0 |
|---|---|---|---|
| 0 | 1 | 1 | 0 |
| 0 | 1 | 1 | 0 |
| 0 | 0 | 0 | 0 |

| 1 | 2 | 3 | 4 | 5 | 6 | ... |
|---|---|---|---|---|---|---|
| 0 0 0 0 | 0 0 0 0 | 0 0 0 0 | 0 0 0 0 | 0 0 0 0 | 0 0 0 0 | |
| 0 1 1 0 | 0 1 1 0 | 0 1 1 0 | 0 1 1 0 | 0 1 1 0 | 0 1 1 0 | ... |
| 0 1 1 0 | 0 1 1 0 | 0 1 1 0 | 0 1 1 0 | 0 1 1 0 | 0 1 1 0 | |
| 0 0 0 0 | 0 0 0 0 | 0 0 0 0 | 0 0 0 0 | 0 0 0 0 | 0 0 0 0 | |

| 1 | 2 | 3 | 4 | 5 | 6 | ... |
|---|---|---|---|---|---|---|
| 0 0 0 0 | 1 0 0 0 | 1 0 0 0 | 1 0 0 0 | 0 0 0 0 | 1 0 0 0 | |
| 0 1 1 0 | 0 1 1 0 | 0 1 1 0 | 0 1 1 0 | 0 1 1 0 | 0 1 1 0 | ... |
| 0 1 1 0 | 0 1 1 0 | 0 1 1 0 | 0 1 1 0 | 0 1 1 0 | 0 1 1 0 | |
| 0 0 0 0 | 0 0 0 0 | 0 0 0 0 | 0 0 0 0 | 0 0 0 0 | 0 0 0 0 | |
| IRRI=0 | IRRI=1 | IRRI=2 | IRRI=3 | IRRI=0 | IRRI=1 | |

TONE ERROR CONTROL FOR IMAGE CONTOUR REMOVAL

This invention relates to electronic image processing, and more particularly to an improved image screening process.

In electronic imaging systems, the image data representative of the original image may be provided by a raster scanner, different types of which may be readily envisioned. Scanners of this type serve to convert the original image into a series of electrical signals, the voltage levels of which reflect the image pattern viewed. Where the original image comprises a halftone or continuous tone picture, screening of the image signals generated by the scanner is normally necessary in order to convert the image signals to a more usable form.

In such systems, high screen frequencies and low scanner output frequencies indicate that the halftone cells comprise relatively few picture elements (pixels herein) and correspondingly few gray levels. And, where the maximum number of principle gray levels is relatively low, contouring may appear in the output image as a result of the rather abrupt changes occasioned by the small number of principle gray levels available, such contouring appearing as discontinuities in the output image not present in the original image.

The invention relates to the method of processing multi-level image data by screening the image data block-by-block with a screen having plural discrete threshold values to produce a binary level output representative of the image while reducing objectionable image contouring between adjoining blocks of screened image data, comprising the steps of: screening a first block of image data; determining the average gray level of the first block of image data before screening; determining the average gray level of the first block of image data as if the data had been screened; comparing the average gray levels of the first block of image data with one another to identify any error resulting from screening; compensating for any error found by algebraically summing the error with the screen discrete threshold values to provide a modified screen; and screening the next succeeding block of image data using the modified screen.

The objects and advantages of the present invention will be apparent from the ensuing description and drawings in which.

As used herein, the term "pixel" refers to a "picture element" which comprises a voltage level representation of a minute and discrete portion of an original image.

Figure 1:
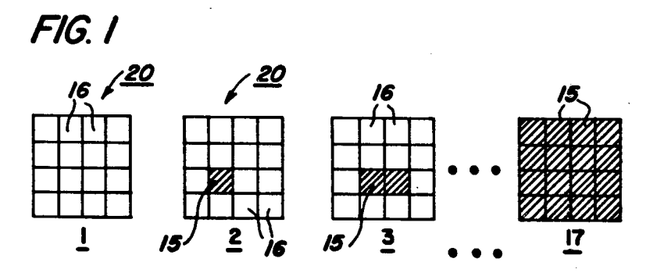
FIG. 1 is a view of exemplary screen cells illustrating various gray levels associated with each cell pattern.

In electronic image processing systems, high screen frequencies and low scanner output frequencies indicate that the halftone cells comprise relatively few pixels and correspondingly, few gray levels. For example, if the frequency of the image viewing device is 500 pixels/in and the screen frequency is 125 dots/in, each halftone cell contains 16 pixels such as shown in the 4×4 pixel cell 20 of FIG. 1 of the drawings. The maximum number of principle gray levels for a cell of the size of cell 20 is seventeen, it being understood that various gray levels are possible within each cell depending upon the relative location of the various black and white pixels 15, 16 that comprise each cell. As a result, a pronounced contouring effect may appear on the output image when processing images using high screen frequencies and low scanner output frequencies. That is, from a smoothly varying input gray level, the output gray level following halftone processing may contain discontinuities or contouring.

Figure 2:
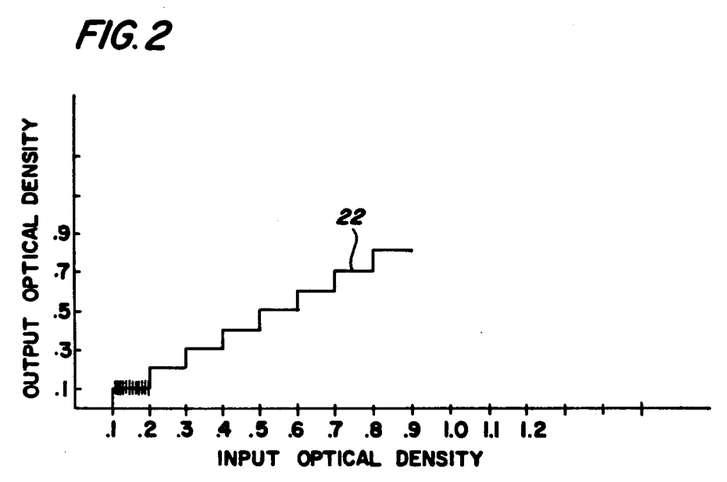
FIG. 2 is a graph showing the relationship between input and output optical densities.

The effect of conventional halftoning techniques on the output image is the tendency of those techniques to print either too light or too dark a halftone cell over a range of input gray levels. In FIG. 2, an exemplary tone reproduction curve (TRC) 22 is shown illustrating for example the tendency of conventional halftoning techniques to print too light a halftone cell over a range of input gray levels. For example, over an input optical density range of 0.1-0.2, conventional halftoning techniques produce a fixed output optical density of 0.1; over an input optical density range of 0.2-0.3, a fixed output optical density of 0.2, etc.

In the present invention, as will appear, the halftone screening process is continuously monitored for differences between the gray levels of the input image relative to the output image. This difference, termed gray scale error (IRRI) herein, is utilized to correctively modify the screening parameters for subsequent portions of the image to eliminate or reduce the tendency of image halftone processing to produce objectionable contouring or discontinuities in the output image.

For purposes of explanation, the input image is screened in blocks or cells 20 four pixels long by four lines (i.e. lines $L_1$, $L_2$, $L_3$, $L_4$) wide. Other screening arrangements, i.e. three pixels by three lines (3×3), five pixels by five lines (5×5), etc. may instead be contemplated.

In accordance with the present invention, pixel image data from a suitable source 10 is processed in blocks or cells 20. In the exemplary arrangement shown, each cell 20 comprises a matrix 4 pixels in length by 4 lines wide. The gray scale error (if any) of each cell is determined and passed along to the next succeeding cell to modify the thresholds of screen 23 (FIGS. 3 and 7) on a cell by cell basis. In the case of the first cell, an error is randomly chosen. This process is repeated until the end of the line is reached at which point the error (if any) accumulated is discarded and the process started anew for the next set of lines.

Assuming that processing is effected from left to right along the scan line, the gray scale error (IRRI) for the first, i.e. leftmost cell 20 is picked at random. The randomly picked error is used to modify screen thresholds when screening the first cell.

For the next succeeding cell and for the remainder of the cells along the scan line, the error (IRRI) is determined according to the following algebraic relationship:

$$IRRI = (\text{Actual Average Gray Level} - \text{Average Gray Level As If Printed}) + IRRI': \quad (1)$$

$$IRRI = (IAVG + IRRI') - 4\{(IAVG + IRRI')/4\} \quad (2)$$

where IRRI represents the error;
  IAVG represents the average gray level of the last cell processed,
  $\{(IAVG+IRRI')/4\}$ represents the integer part of the indicated division; and
  IRRI' represents the error of the cell preceding the last cell processed. When determining the error for the second cell, the randomly picked error is used for IRRI' in the above formulation.
  IAVG is determined according to the following relationship:

$$IAVG = (Ig1 + Ig2 + \ldots + IgN/N) \quad (3)$$

where Ig represents the image value of each pixel that comprises the last cell processed; and
  N represents the total number of pixels that comprise the last cell processed.

Figure 3:
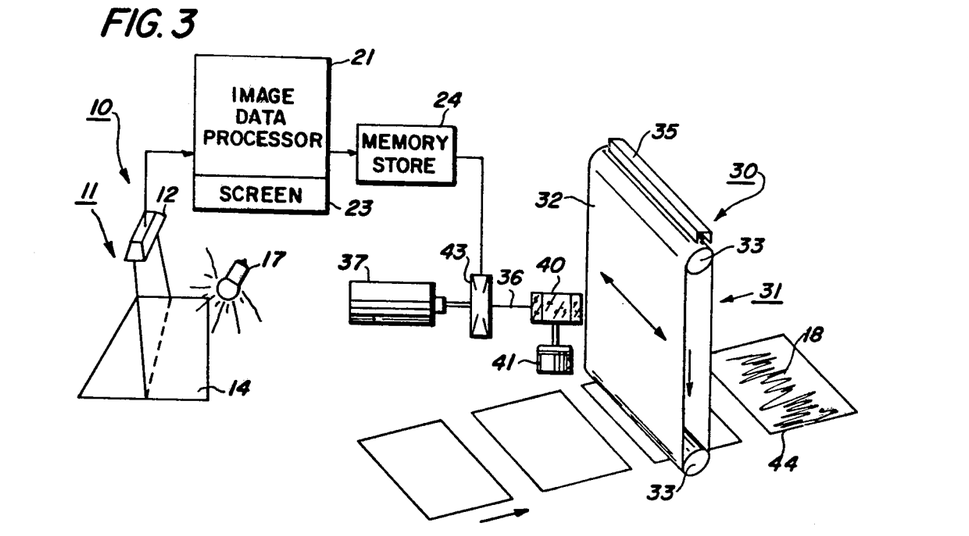
FIG. 3 is a schematic view of an exemplary electronic imaging processing apparatus embodying the present invention.

In FIG. 3, an exemplary electronic imaging system incorporating the image data processing system of the present invention is thereshown in schematic form. The imaging system thereshown includes a suitable source 10 of image data to be processed as for example scanning means 11. Scanning means 11 includes one or more charge coupled devices (CCD) 12 adapted to raster scan on a line by line basis an original document 14 to provide signals, i.e. pixels, representative of the original image. A suitable illumination source, shown as lamp 17, is provided to illuminate the document during scanning. CCD 12 may be supported on a movable carriage (not shown) arranged to carry CCD 12 past document 14 during the scanning cycle. Suitable lens means (not shown) are provided to focus the image rays onto CCD 12, with control means (not shown) provided to control the various scanning means components.

CCD 12, which operates to convert the graphical image that comprises document 14 into an electronic image, consists of a multiplicity of photosensors on which charges are built proportional to the luminous energy reflected from the document 14 during each scan. The charges, which in the example discussed, may range from a "0" representing blackest black to "63" representing whitest white, are thereafter transferred from the photosensors to a shift register pair for temporary storage. In one manner of operation, the charge on odd order photosensors are transferred to one shift register while the charges on the even order photosensors are transferred to the other shift register. Thereafter, the outputs of the shift registers are sampled sequentially, alternating between the registers such that the output of the CCD appear in correct sequential order.

One suitable CCD comprises Fairchild Model No. 1728 by Fairchild Manufacturing Company.

Image data from CCD 12 is input to Image Data Processor 21 whereat the image data is processed to binary form pending storage and/or use thereof. Processor 21 includes Screen 23, for converting the image data to binary form as will appear.

Following processing of the image data, the data may be fed to a suitable storage device or memory 24 (MEMORY STORE) where the data is stored pending use thereof by a suitable output device such as printer 30. Printer 30 includes a xerographic processing unit 31 with endless photoconductive belt 32 movably disposed about roller pair 33. A charging device 35 places a uniform electrostatic charge on belt 32 preparatory to exposure thereof by imaging beam 36. Imaging beam 36, which scans across belt 32, is derived from a suitable light source such as laser 37 via a reflective polygon 40. Polygon 40 is rotated by motor 41 to reflectively scan imaging beam 36 across belt 32. A suitable light beam control such as acousto optic modulator 43 regulates the intensity of imaging beam 36 in response to image data from memory 24 to selectively discharge belt 32 and form thereon a latent electrostatic image of the original document 14. Following development (not shown), the image is transferred to a copy sheet 44. A suitable fuser (not shown) fixes the transferred image to provide a permanent copy.

Sources of image data other than the aforedescribed scanning means 11, and/or data users other than printer 30 may be readily contemplated.

Figure 4:
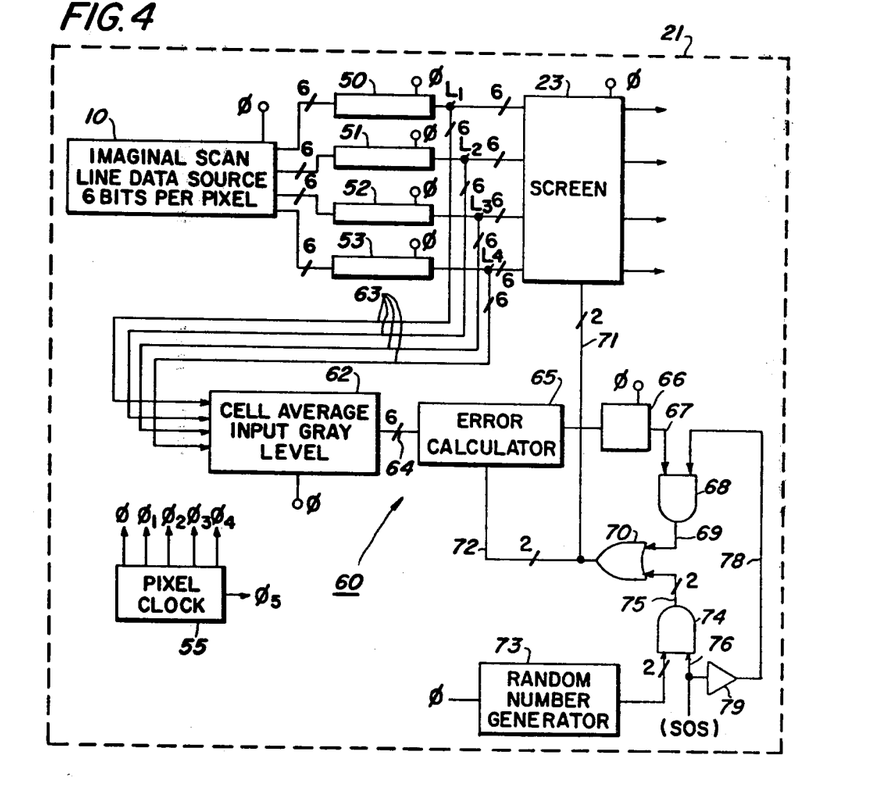
FIG. 4 is a schematic view of the imaging processing system of the present invention.

Referring to FIG. 4, Image Data Processor 21 includes plural line buffers 50, 51, 52, 53, for receiving pixel image data from the data source, i.e. scanning means 11. Buffers 50, 51, 52, 53, which comprise any suitable commercially available digital storage buffers, serve, in the exemplary embodiment described herein, to temporarily store the pixel image data from four consecutive image lines (for example, lines $L_1$, $L_2$, $L_3$, $L_4$) pending screening thereof. Data from buffers 50, 51, 52, 53 is screened in blocks or cells 20 four pixels long by four lines wide at a time, clock signals $\phi$ from pixel clock 55 serving to unload buffers 50, 51, 52, 53 in blocks of four pixels at a time.

Pixel image data from buffers 50, 51, 52, 53 is fed in blocks of four pixels each to Screen 23. There the image data is screened, with the output, now in binary form, fed to memory store 24 or printer 30.

It will be understood that processing image pixels in blocks of four simultaneously from four consecutive lines (i.e. lines $L_1$, $L_2$, $L_3$, $L_4$) provides the 4×4 cell 20 referred to earlier herein. Other cells sizes, i.e. 5×5, 3×3, etc. may instead by contemplated.

To control and adjust the threshold levels of Screen 23 in accordance with the present invention, the pixel image data from line buffers 50, 51, 52, 53 is fed via lines 63 to Cell Average Input Gray Level calculator 62 of error detection network 60 wherein the average gray level of the block of image data (IAVG) is determined. The output of calculator 62 is fed via line 64 to Error Calculator 65 whereat the difference (IRRI) between the actual average gray level and the average gray level as if printed of the preceding cell is determined as will appear more fully herein.

The output of Error Calculator 65, (if any) representing the error in the cell, is fed via lead 67, two bit storage or delay buffer 66, AND gate 68, lead 69, OR gate 70, and lead 71 to screen 23 where the error is used to modify the threshold levels of halftone screen 23 for the succeeding cell. The error (if any) is at the same time returned to error calculator 65 via lead 72 where the error is algebraically summed with the error (if any) associated with the following or next succeeding cell. The process is then repeated for the next cell 20 and so forth and so on until all the image data has been screened.

At startup, in the absence of any previous error, an error value is randomly chosen. And, preferably, following processing of the last cell of pixels in each four line sequence, the accumulated error value (if any) is discarded and a new randomly chosen error value is used to initiate processing of the next four line sequence, (i.e. lines $L_5$, $L_6$, $L_7$, $L_8$).

To provide an error at startup and at the beginning of each new four line sequence, a suitable Random Number Generator 73 such as described in Motorola Semiconductor Application Note No. AN-576 is provided. Generator 73 is driven by clock signals $\phi$ from pixel clock 55. The output of Random Number Generator 73 is fed via AND gate 74 and lead 75 to OR gate 70. An enabling signal (S.O.S.) is generated in lead 76 to AND gate 74 in response to the first block of pixels of any four line sequence. The enabling signal (S.O.S.) to gate 74 is also applied via lead 78 and inverter 79 to AND gate 68 to temporarily disable any signal output from error calculator 65.

Figure 5:
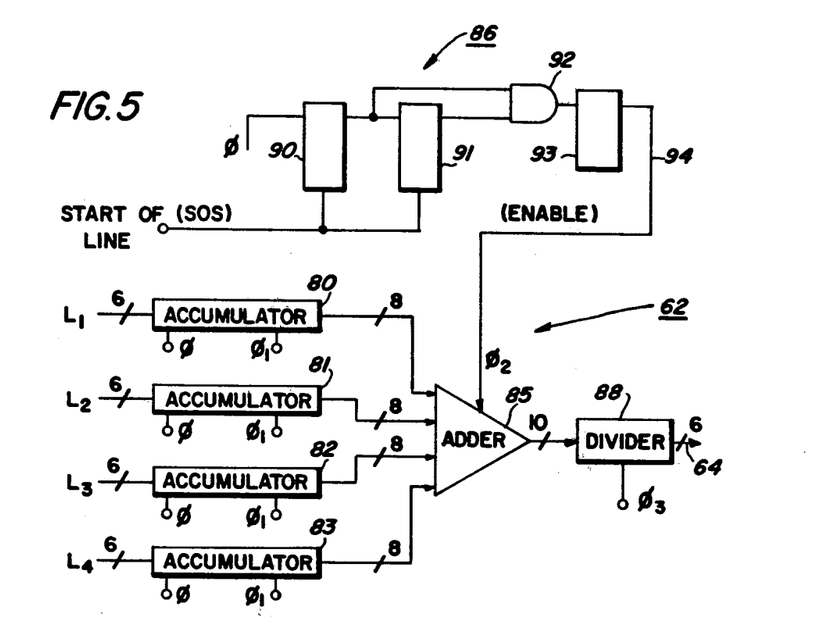
FIG. 5 is a detailed view of the Cell Average Input Gray Level calculator of FIG. 3.
Figure 13:
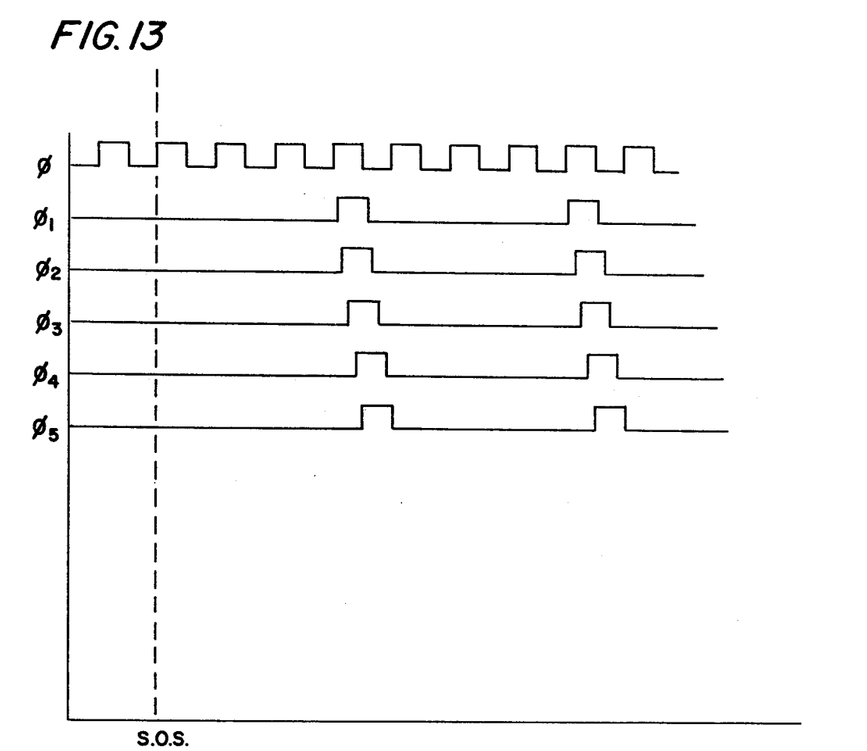
FIG. 13 is a timing chart showing the timing interrelationship between the various components of the imaging processing system of the present invention.

Referring now to FIGS. 5 and 13 of the drawings, Cell Average Input Gray Level calculator 62 includes an 8 bit accumulator 80, 81, 82, 83 associated with each of the lines $L_1$, $L_2$, $L_3$, $L_4$ that comprise the cell 20 being processed. Accumulators 80, 81, 82, 83 may for example, be built from two concatenated Texas Instrument adder chips No. SN 7483 and storage flip flops. Accumulators 80, 81, 82, 83 add together the four pixel block of image data in the image line associated therewith and on clock signal $\phi_1$ provide a single 8 bit output representative of the sum to adder 85. Adder 85, on an enabling pulse $\phi_2$ from timing circuit 86, sums the inputs thereto to provide a 10 bit output representative of the sum of the inputs from accumulators 80, 81, 82, 83. Effectively then, accumulators 80, 81, 82, 83 and adder 85 have summed the discrete image values of the pixels that comprise the 4×4 matrix cell 20 being processed to provide a single total image value.

The output of adder 85 is fed to divider 88. Divider 88 which for example, may be built from a standard 10 bit shift register, divides the output of adder 85 by 16, the total number of pixels that comprise the 4×4 cell matrix 20 on an enabling pulse $\phi_3$. The output of divider 88 provides the average input gray level (IAvg) for the cell 20 being processed.

Timing circuit 86 serves to enable adder 85 for a brief period following processing of each four pixel block of image data by accumulators 80, 81, 82, 83. Circuit 86 includes a pair of flip flops 90, 91 driven off of pixel clock 55. A reset pulse (SOS) serves to reset flip flops 90, 91 at the start of each line. The output of flip flops 90, 91 to AND gate 92 control one shot multi-vibrator 93.

Following each block of four clock pulses, corresponding to the input of four pixels from each of the lines being processed (i.e. lines $L_1$, $L_2$, $L_3$, $L_4$) to accumulators 80, 81, 82, 83, AND gate 92 actuates multivibrator 93 which in turn generates an enabling signal $\phi_2$ to adder 85.

Figure 6:
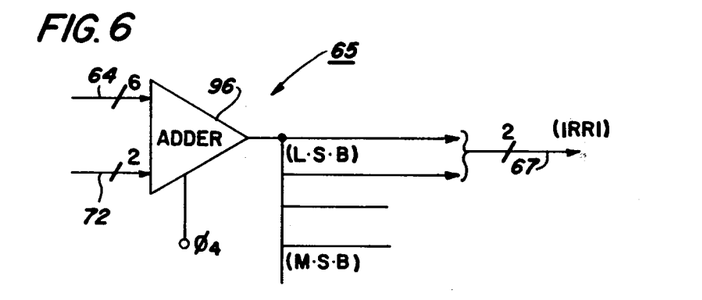
FIG. 6 is a detailed view of the Error Calculator of FIG. 3.

Referring now to FIGS. 6 and 13 of the drawings, Error Calculator 65 includes an adder 96 for summing the average input gray level of the cell 20 being processed, as represented by the 6 bit output of divider 88 in line 64, with the error signal (if any), as represented by the 2 bit output of OR gate 70 in line 72, together on a clock signal $\phi_4$. It will be understood that the error signal is the error signal of the preceding cell 20 or, in the case where the cell being processed is the first cell of the line, the signal generated by random number generator 73.

The error signal IRRI is effectively algebraically calculated by discarding all but the two least significant bits (LSB) of adder 96. The error (IRRI) signal from calculator 65 to storage unit 66 and thence to AND gate 68 accordingly is a two bit signal.

As will be understood from the preceding description, the error signal determined for each cell is used to modify the threshold levels of Screen 23 for the next succeeding cell. Delay buffer 66 serves to impose the requisite delay on input of the error signal to screen 23 while the preceding cell is processed.

Figure 8:
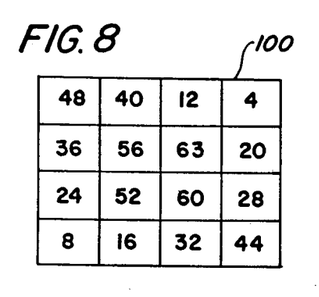
FIG. 8 is an example of a screen cell with threshold values.

Referring particularly to FIG. 8 of the drawings, an exemplary halftone screen 100 is thereshown with typical voltage thresholds represented thereon. Screen 100 is four pixels long by four lines wide in correspondence with cell 20. In the present invention, as described, screen threshold values are modified by the addition of the error signal (if any) supplied by error detection network 60.

In operation, where the pixel voltage level is equal to or above the screen threshold value for a given pixel position, a binary "0" output results. Where the pixel voltage level is below the screen threshold value, a binary "1" output results.

Figure 9:
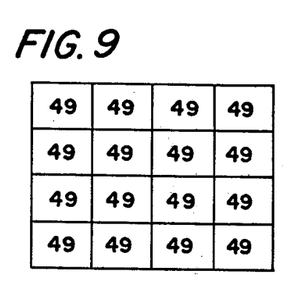
FIG. 9 is an example of an image cell before screening.
Figure 10:
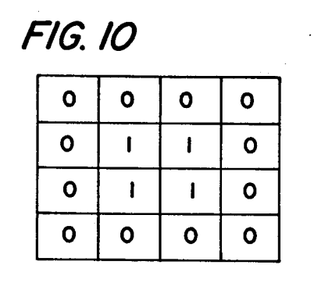
FIG. 10 is a view of the image cell of FIG. 9 following screening.

In FIG. 9, an exemplary image cell is thereshown having presumed pixel voltage levels of "49". Application of screen 100 thereto provides the binary output pattern shown in FIG. 10.

Figure 7:
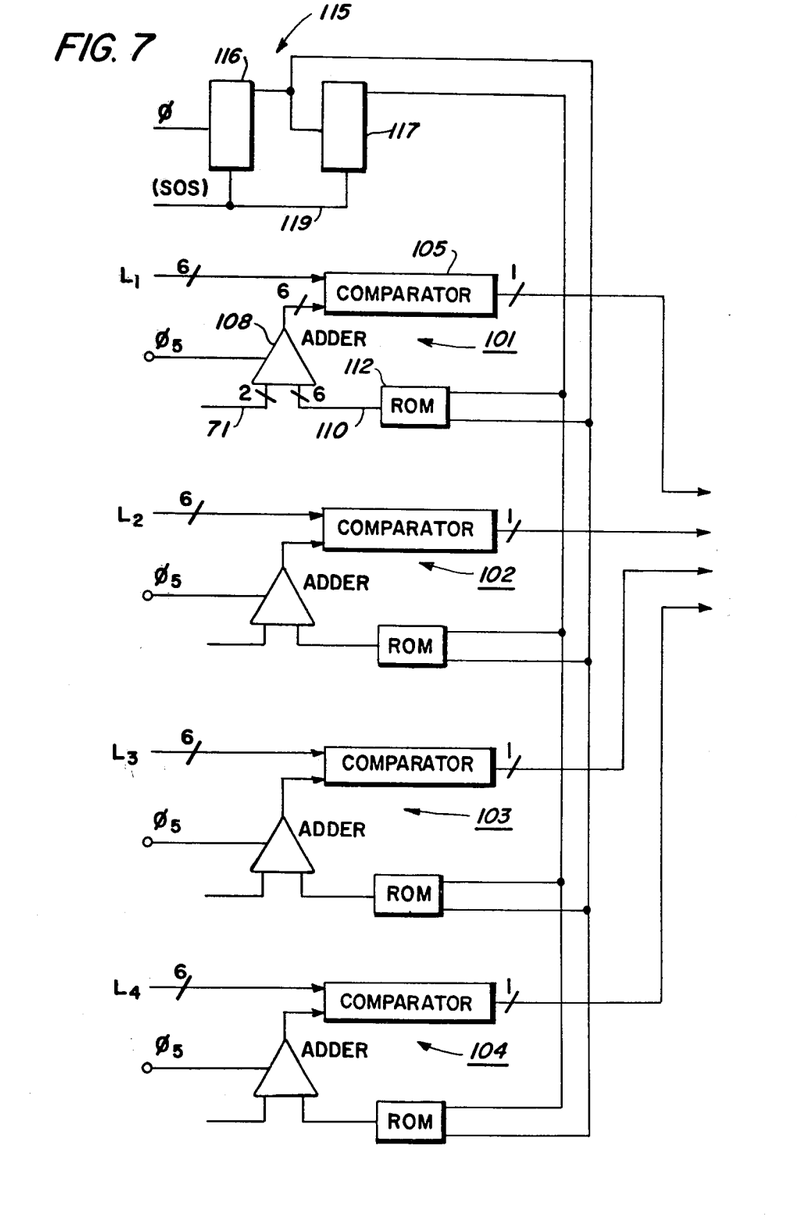
FIG. 7 is a detailed view of the Screen of FIG. 3.

Referring to FIGS. 7 and 13, screen 23 comprises sections 101, 102, 103, 104 for each of the lines of image data (i.e. lines $L_1$, $L_2$, $L_3$, $L_4$) being processed. Each screen section 101, 102, 103, 104 has a 6 bit comparator 105 which may be built by the concatenation of Texas Instrument Chips No. SN 7485, for comparing the pixel image voltage from image data source 10 with the appropriate screen threshold value from adder 108. Adder 108, on a clock signal $\phi_5$, sums inputs from error detection network 60 in lead 71, representing the current error signal (if any), with the individual screen threshold values from ROM memory 112 in lead 110.

ROM memories 112 store the various predetermined screen threshold values such as shown in FIG. 8. ROM memories 112 are addressed by ROM address circuit 115 which repeatedly addresses the various screen threshold values for input to adder 108. In the example given, each ROM memory 112 provides four discrete threshold values for comparison with four image pixels, following which the process is repeated for the next block of four pixels, and so forth until all of the pixels in the lines being processed (i.e. lines $L_1$, $L_2$, $L_3$, $L_4$) have been processed, following which the process is repeated for the next group of lines (i.e. lines $L_5$, $L_6$, $L_7$, $L_8$).

Address circuit 115 includes a pair of series coupled flip flops 116, 117 driven by clock pulses $\phi$ from pixel clock 55. Flip flops 116, 117 repeatedly generate a block of four address codes which are used to address ROMs 112 to provide the discrete screen threshold value used to process the individual pixels in each block of four pixels as described. Flip flops 116, 117 are reset at the start of each line by a reset signal (SOS) in line 119.

Figure 11:
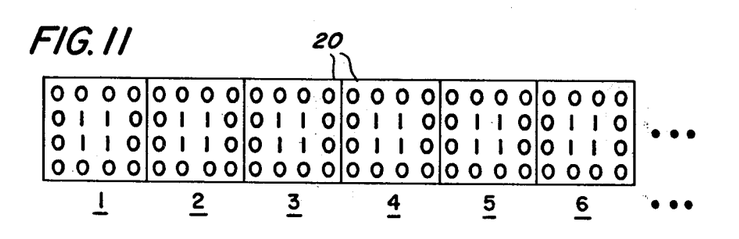
FIG. 11 is an example of image data following conventional screening.
Figure 12:
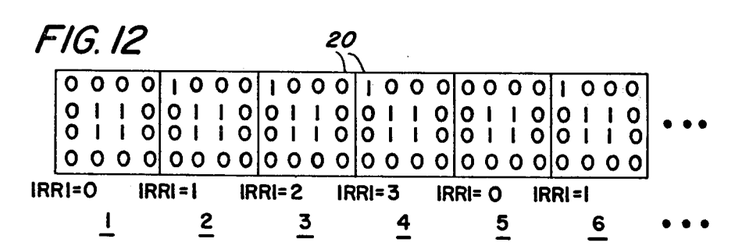
FIG. 12 is an example of the image data of FIG. 11 following screening in accordance with the present invention.

Referring to FIGS. 11 and 12, there is provided an example of image processing, one (FIG. 11) without the present invention, the other (FIG. 12) embodying the present invention. In the example, an exemplary pixel image pattern has been assumed for purposes of explanation. Other image patterns may be similarly contemplated.

In FIG. 11, it is presumed that the image comprises pixels whose image values are "49". When processed conventionally using screen 100 (FIG. 8), the resulting binary output, on a cell-by-cell basis, is that shown in FIG. 11. It is understood that on printout the binary "1" values are printed as black dots while the binary "0" values are white.

In FIG. 12, and assuming the initial random error (IRRI) generated by random number generator 73 to be equal to "0"; processing of the cells 20 in accordance with the present invention alters the image output pattern somewhat to provide a binary "1" (i.e. a black dot) in one of the pixel positions between adjoining cells in the case of cells numbers 2, 3 and 4 following which the cell output pattern is repeated (assuming that the image input data remains the same). The error (IRRI) for each cell, as determined by the invention, is shown at each cell position.

The alteration in output cell image pattern tends to compensate for the coarse quantization in the original TRC (see FIG. 2), which in turn negates or reduces discontinuities and contouring in the output image produced.

While the present invention has been illustrated and described as processing a 4×4 cell 20, other cell sizes may be contemplated. It will be apparent however, that where a cell size other than 4×4 is processed, the numbers of components in the aforedescribed circuit diagrams and the timing sequences will undergo a corresponding change. For example, if the pixel image data were to be processed in blocks or cells five pixels long by five lines wide (i.e. a 5×5 cell), then an additional line buffer, accumulator, and screen section must be provided. Further, the timing sequences shown in FIG. 13 will be modified to accomodate the additional pixel in each cell.

It will also be understood that while even or square cell sizes (i.e. 4×4) have been discussed herein, cells of uneven dimension, as for example 4×2, or 5×3, may be contemplated.

While the invention has been described with reference to the structure disclosed, it is not confined to the details set forth, but is intended to cover such modifications or changes as may come within the scope of the following claims.

What is claimed is:

1. The method of processing multi-level image data by screening said image data in blocks of predetermined size with a screen having plural discrete threshold values to produce a binary level output suitable for reproduction while reducing objectionable image contouring effects between adjoining blocks of screened image data, the steps which comprise:
   (a) screening a first block of said image data to provide binary level image output data;
   (b) determining the average gray level of said first block of image data before screening;
   (c) determining the average gray level of said first block of image data as if said first block of image data were screened;
   (d) comparing the average gray levels of steps b and c to identify any error associated with screening of said first block of image data;
   (e) compensating for said error by algebraically summing said error with said screen discrete threshold values to provide a modified screen; and
   (f) screening the second succeeding block of image data using said modified screen.

2. The method according to claim 1 including the steps of:
   (a) determining the average gray level of said second block of image data before screening;
   (b) determining the average gray level of said second block of image data as if said second block of image data were screened;
   (c) comparing the average gray levels of steps a and b to identify any error associated with screening of said second block of image data;
   (d) compensating for said second block error by algebraically summing said second block error and the preceding error with said screen threshold values to provide a second modified screen;
   (e) screening the third succeeding block of image data with said second modified screen;
   (f) repeating steps a–d for said third block of image data; and
   (g) repeating steps e and f until all the blocks of image data that comprise said image are screened.

3. The method according to claims 1 or 2 including the step of randomly choosing said error for said first block of image data.

4. The method according to claim 2 including the step of randomly choosing an error for each new line of image data processed.

5. The method according to claim 1 including the step of determining the average gray level of said first block of image data after said first block of image data has been screened.

6. The method according to claim 1 including the step of predicting the average gray level of said first block of image data after screening of said first block of image data.

7. The method of screening multi-level image data to reduce objectionable image contouring, said screening being effected by a screen having plural discrete threshold values, the steps which comprise:
   (a) randomly choosing an error;
   (b) algebraically summing said randomly chosen error with said screen threshold values to provide a modified screen;
   (c) screening a first block of image data with said modified screen to provide a first block of binary level image output data;
   (d) determining the average gray level of said first block of said image data before screening;
   (e) determining the average gray level of said first block of image data as if said block of image data were screened;
   (f) comparing the average gray levels of steps d and e to identify any first block error;
   (g) compensating for said first block error by algebraically summing said first block error and said randomly chosen error with said screen discrete threshold values to provide a second modified screen;

(h) screening a second succeeding block of image data using said second modified screen;

(i) repeating steps d-f for said second succeeding block of image data;

(j) compensating for said second block error by algebraically summing said second block error and said first block error with said screen discrete threshold values to provide a third modified screen; and (k) repeating steps h-j for succeeding blocks of image data until processing of said image is completed.

* * * * *